United States Patent
Harris

[11] Patent Number: 5,990,052
[45] Date of Patent: Nov. 23, 1999

[54] FOAMED FRACTURING FLUID

[75] Inventor: Phillip C. Harris, Duncan, Okla.

[73] Assignee: Halliburton Energy Services, Inc., Duncan, Okla.

[21] Appl. No.: 08/686,009

[22] Filed: Jul. 25, 1996

Related U.S. Application Data

[62] Division of application No. 08/300,604, Sep. 2, 1994, Pat. No. 5,566,760.

[51] Int. Cl.[6] .............. C09K 3/00; E21B 43/17
[52] U.S. Cl. ............ 507/214; 507/216; 507/202; 507/209; 507/211; 166/308
[58] Field of Search .................. 507/211, 214, 507/216

[56] References Cited

U.S. PATENT DOCUMENTS

| | | | |
|---|---|---|---|
| 3,153,450 | 10/1964 | Foster et al. | 166/42 |
| 3,195,634 | 7/1965 | Hill | 166/42 |
| 3,310,112 | 3/1967 | Nielsen et al. | 166/42 |
| 3,368,627 | 2/1968 | Hurst et al. | 166/42 |
| 3,664,422 | 5/1972 | Bullen | 166/283 |
| 3,937,283 | 2/1976 | Blauer et al. | 166/307 |
| 3,980,136 | 9/1976 | Plummer et al. | 166/280 |
| 4,553,601 | 11/1985 | Almond et al. | 166/308 |
| 4,619,776 | 10/1986 | Mondshine | 252/8.551 |
| 4,627,495 | 12/1986 | Harris et al. | 166/280 |
| 4,870,167 | 9/1989 | Zody et al. | 536/114 |
| 5,002,125 | 3/1991 | Phillips et al. | 166/271 |
| 5,024,276 | 6/1991 | Borchardt | 166/308 |
| 5,076,357 | 12/1991 | Marquis | 166/273 |
| 5,233,032 | 8/1993 | Zody et al. | 536/114 |
| 5,333,687 | 8/1994 | Osterloh | 166/272 |
| 5,424,285 | 6/1995 | Stacy et al. | 507/202 |
| 5,480,984 | 1/1996 | Angerer et al. | 536/88 |
| 5,566,760 | 10/1996 | Harris | 166/308 |
| 5,720,347 | 2/1998 | Audibert et al. | 166/294 |
| 5,741,482 | 4/1998 | Modi et al. | 424/76.3 |

OTHER PUBLICATIONS

"Recent Advances in Hydraulic Fracturing"; by Gidley, Holditch, Nierode, and Veatch; p. 198; Society of Petroleum Engineers, Henry L. Doherty Memorial Fund of AIME, Richardson, Texas 1989.

"Fracture Conductivity Impairment Removal"; by Norman, Hollenbeak, and Harris; SPE Paper No. 19732; presented Oct. 1989.

"A Comparison of Mixed Gas Foams with $N_2$ and $CO_2$ Foam Fracturing Fluids on a Flow Loop Viscometer"; by Harris; SPE Paper No. 20642; presented Sep. 1990.

"Application of Foam Fluids to Minimize Damage During Fracturing"; by Harris; SPE Paper No. 22394; presented Mar. 1992.

"Polymers in Aqueous Media Performance Through Association"; edited by J. Edward Glass; sponsored by Division of Polymeric Materials: Science & Engineering, American Chemical Society; ch. 18, pp. 343–364, 1989.

*Primary Examiner*—C. H. Kelly
*Attorney, Agent, or Firm*—Robert A. Kent

[57] ABSTRACT

An aqueous foamed fracturing fluid composition and method for using the foamed fracturing fluid for fracturing subterranean formations that have been penetrated by a wellbore wherein the foamed fracturing fluid comprises: (a) a viscosifier which is preferably either hydrophobically modified guar or hydrophobically modified hydroxymethylcellulose; (b) a surfactant which is preferably alpha olefin sulfonate; and (c) the gas phase includes either nitrogen or carbon dioxide.

9 Claims, 1 Drawing Sheet

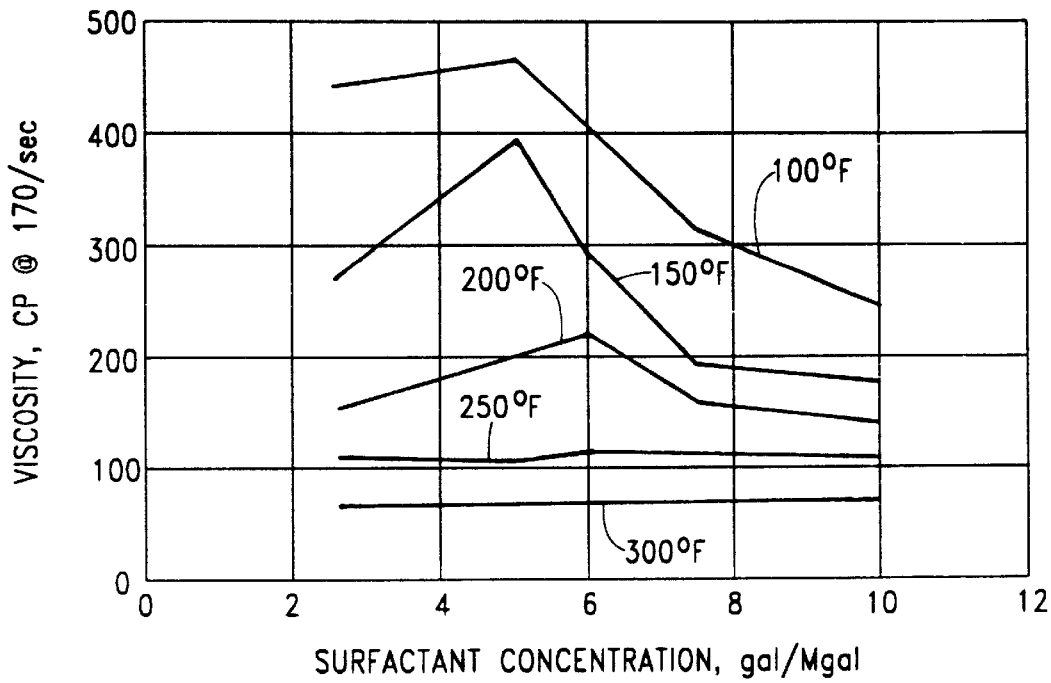
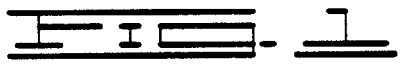
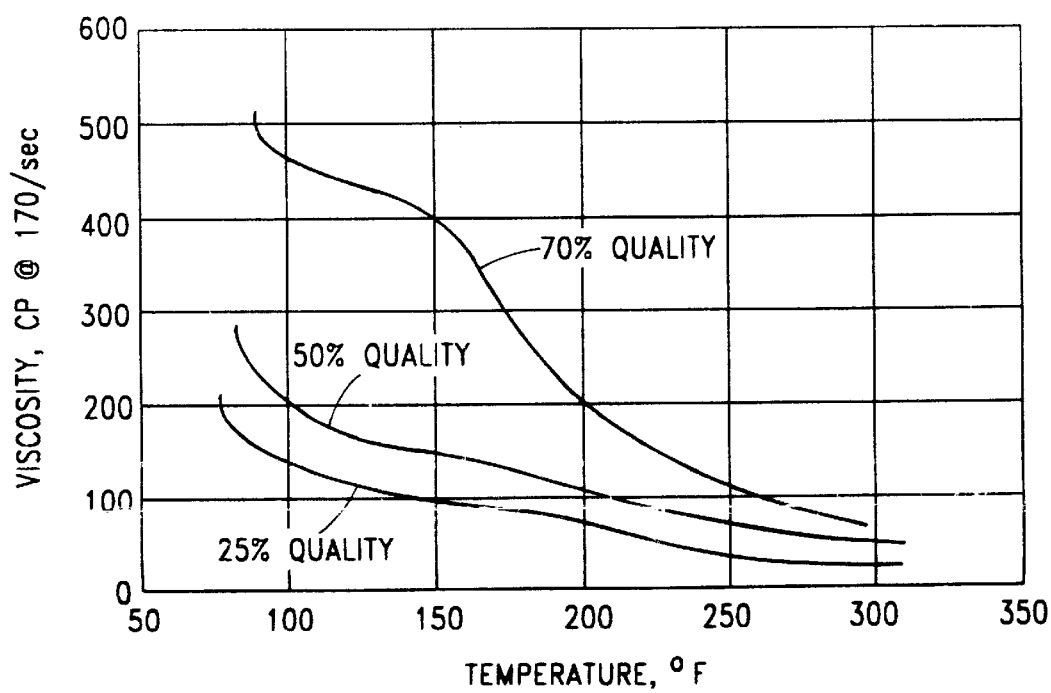
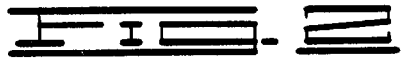

FOAMED FRACTURING FLUID

This is a request for filing a divisional application under 37 CFR 1.60, of pending prior patent application Ser. No. 08/300.604, filed on Sep. 2, 1994, U.S. Pat. No. 5,566,760 of "Foamed Fracturing Fluid" for Phillip C. Harris.

FIELD OF THE INVENTION

This invention relates generally to fluids and procedures for hydraulically fracturing subterranean formations to stimulate production of crude oil and natural gas from wells. More specifically, this invention relates to foamed fracturing fluids and particularly to foamed fracturing fluids in which a hydrophobically modified polymer is used to increase viscosity of the foam.

BACKGROUND OF THE INVENTION

Crude oil and natural gas residing in subterranean porous formations are produced by drilling wells into the formations. Oil and/or natural gas flow into the well driven by the pressure gradient which exists between the formation and the well, gravity drainage, fluid displacement, and capillary action. Typically, surface pumps are required to supplement the natural driving forces to bring the hydrocarbons to the surface.

Most wells are hydraulically fractured to increase flow. The drill pipe casing section adjacent to the zone to be fractured is perforated using explosive charges or water jets. Then a fracturing fluid is pumped down the drill pipe a: a rate and pressure high enough to fracture the formation. The fractures propagate as vertical and/or horizontal cracks radially outward from the wellbore.

Solid particles called proppants are dispersed into the fracturing fluid. Proppants lodge in the propagated fractures and hold them open after fracturing fluid hydraulic pressure is released and the fracturing fluid flows back into the well. Without proppants, the cracks would close and the increased permeability gained by the fracturing operation would be lost. Proppants must have sufficient compressive strength to resist crushing, but also must be sufficiently non-abrasive and non-angular to preclude cutting and imbedding into the formation.

The primary consideration in selecting a proppant is the pressure in the subterranean formation to be fractured. Suitable proppants include sand, graded gravel, glass beads, sintered bauxite, resin coated sand and ceramics. In formations under moderate pressure, 6000 psi or less, the most commonly used proppant is ordinary screened river sand. For formations with closure stresses 6000 to about 10,000 psi, sand proppants coated with a thermosetting phenolic resin are preferred. Sintered bauxite, glass beads and ceramics are used to fracture wells with closure pressure in the range of 10,000 to 15,000 psi.

The rheological requirements of a fracture fluid are highly constraining. To adequately propagate fractures in the subterranean formation, a fracturing fluid must exhibit low leakage rate of liquids into the formation during the fracturing operation. Also, the fracturing fluid must have sufficient body and viscosity to transport and deposit large volumes of proppant into the cracks in the formation formed during fracturing. The fracturing fluid must readily flow back into the well after the fracturing is complete and not leave residues that impair permeability and conductivity of the formation. Finally the fracturing fluid must have rheological characteristics which permit it to be formulated and pumped down the well without excessive difficulty or pressure drop friction losses.

The most commonly used fracturing fluids are water-based compositions containing a hydratable high molecular weight polymeric gelling material which increases the viscosity of the fluid. Thickening the fluid reduces leakage of liquids from the fracture fissures into the formation during fracturing and increases proppant suspension capability.

A wide variety of hydratable viscosifiers are used in fracturing fluid formulations including polysaccharides, polyacrylamides and polyacrylamide copolymers. Polysaccharides are currently favored. Particularly desirable polysaccharides include galactomannan gum and cellulose derivatives. Specific polysaccharides include guar gum, locust bean gum, carboxymethylguar, hydroxyethylguar, hydroxypropylguar, carboxymerhylhydroxypropylguar, carboxymethylhydroxyethylguar, sodium-hydroxymethyl cellulose, sodium carboxymethylhydroxyethyl cellulose, and hydroxyethyl cellulose. Generally, the molecular weights of the hydratable polymers used in fracturing fluids range from about 500,000 to about 3,000,000. The ratio of apparent viscosity of the fracturing fluid relative to water at shear rates encountered in well fractures is between from about 50 to about 2000. Currently, viscosifier concentrations in fracturing fluids range from about 10 to about 100 lbs of viscosifier per 1000 gallons of fracturing fluid.

Over the years the depth of oil and gas wells steadily increased to maintain reserves and production. Downhole temperatures increase with depth. Initially, the reduced viscosity encountered as downhole temperatures increased was compensated by increasing the concentration of viscosifier gelling agent in the fracturing fluids. However, as well depths continued to increase, the concentrations required to maintain adequate downhole viscosity reached the limit past which the fracturing fluid became too difficult to mix and pump at the surface. The solution was to use less polymer viscosifier and to incorporate crosslinking compounds into the fracturing fluids. Crosslinkers form chemical bonds between the viscosifier polymer molecules which raise the viscosity of the solution.

The crosslinking is between cis position hydroxyl groups on adjacent polysaccharide thickener polymer molecules. Common crosslinking agents include polyvalent ions in their high valance state such as Al(IV), Ti(IV), Zr(IV). Also, borate ions are effective crosslinkers for polysaccharides.

The crosslinking agents react with sufficient time delay so that the fracturing fluid may be formulated and pumped down the well. Crosslinking occurs as the fracture fluid heats up as it approaches the formation providing the viscosity enhancement necessary to promote fracturing and proppant transport.

When the fracturing operation is complete and pressure on the formation is reduced, the fracturing fluid flows back out of the formation into the well so that production of oil or gas can begin. To induce recovery of fracture fluid, the viscosity of the fracturing fluid is reduced ("broken") so that it can freely flow back out of the formation and into the well.

Hydratable polymers decompose spontaneously in time from either bacteriological or thermal degradation but the natural degradation is too slow and too much production time is lost. Accordingly, a chemical agent referred to as a "breaker" is added to the fracturing fluid to accelerate viscosity reduction. Breakers operate by severing the backbone chain of the hydrated polymer. The type and concentration of breaker is selected so that the viscosity of fracturing fluid remains sufficiently high to be effective until the fracturing operation has been completed.

Enzyme breakers such as alpha and beta amylases, amyloglucosidase, oligoglucosidase invertase, maltase, cellulase, and hemicellulase are commonly used for wells having a bottomhole temperature below about 150° F. and with fracturing fluids with pH between about 3.5 and 8. Enzymes catalyze the hydrolysis of glycosidic bonds between the monomer units of polysaccharides.

Peroxygen compounds are the preferred breakers for higher temperature downhole temperatures in the range from about 140° F. to about 250° F. temperature range. They form free radicals which attack and sever the backbone of gel polymer chains. Peroxides generally decompose over a narrow temperature range characteristic of the peroxide. Accordingly, premature viscosity breaking can be precluded by selecting a peroxygen with a decomposition temperature close to the temperature in the fractured formation so that peroxide does not decompose until it is heated to formation temperature.

Commonly used peroxygen breakers include dichromates, permanganates, peroxydisulfates, sodium perborate, sodium carbonate peroxide, hydrogen peroxide, tertiarybutylhydroperoxide, potassium diperphosphate, and ammonium and alkali metal salts of dipersulfuric acid. Typical breaker addition rates range from about 0.1 to 10 lbs. per thousand gallons of fracturing fluid. Breakers are usually added to the fracturing fluid at the surface "on-the-fly" as the fluid is being pumped down the well.

A significant number of hydrocarbon bearing subterranean formations can not be fractured by conventional fracturing fluids. These problematic formations include hydrocarbon reservoirs that are under low pressure, subterranean formations that exhibit low permeability to fluid flow, and formations in which permeability is reduced when they absorb water. For example, clay in formations swells when it absorbs water which reduces permeability. Also, fracturing fluids do not readily flow back out of these difficult formations when the fracturing operation is complete; the fluids remain in the formations and they impede the flow of hydrocarbons to the well.

It is important to limit water leakage from fracturing fluids into the formation when fracturing problematic sensitive formations because the water can permanently damage the formations. Also, excessive fluid leakage interferes with fracturing and proppant deposition.

The problem of fluid leakage control in well fracturing can be analogized to filtration. When fracturing is initiated, some fracture fluid liquids unavoidably flow into the formation. But as the fracturing operation proceeds, fluid leakage into the formation is progressively restricted by continuous deposition of the polymer thickening agents used in fracturing fluids. The thickening agents form a thin film over the fracture matrix which is referred to in the fracturing technical literature as a "filtercake." The filtercake must be disrupted after the fracturing operation is completed because if it remains it impedes flow of oil and gas to the well. Excessive buildup of filtercake must be avoided since thick filtercakes are not readily removed. Control and limitation of residual filtercake is particularly important when fracturing problematical subterranean formations. Clearly, for problematical formations, fracturing fluids must provide an optimal balance between minimizing fluid leakage, filtercake buildup thickness and filtercake removal.

An alternative to the conventional all liquid fracturing fluids was developed to provide this critical balance of characteristics and found to be effective for problematical formations: foamed fracturing fluids. Foamed fracturing fluids are media in which a relatively large volume of gas is dispersed in a relatively small volume of liquid, usually with the aid of a surfactant which reduces the surface tension of the fluids. The most commonly used gases for foamed fracture fluids are nitrogen and carbon dioxide because they are non-combustible, readily available and relatively cheap. Currently, foamed fracturing fluids are predominantly water based although oil and alcohol based foams are used.

Capitalizing on the rigid two phase structure and favorable rheological characteristics of foams, foamed fracturing fluids have been formulated which exhibit high proppant carrying and transport capacity. The foams induce manageably low frictional pressure drop as the fluid is pumped down the well and into the formation and effectively fracture subterranean formations. Moreover, foams readily flow back out of the formation into the well when the fracturing operation is complete.

Surfactants used in foamed fracturing fluid formulations to promote and stabilize the gas-liquid dispersions are soap-like molecules containing a long hydrophobic paraffin chain with a hydrophilic end group. Surfactants include cationic, anionic, nonionic or is amphoteric compounds such as for example, betaines, sulfated or sulfonated alkoxylates, alkyl quarternary amines, alkoxylated linear alcohols, alkyl sulfonates, alkyl aryl sulfonates, C10–C20 alkyldiphenyl ether sulfonates and the like. Suitable surfactants include for example polyethylene glycols, ethers of alkylated phenol, sodium dodecylsulfate, alpha olefin sulfonates such as sodium dodecane sulfonate and trimethyl hexadecyl ammonium bromide. Surfactants are added in concentrations which range typically from about 0.05 to about 2 percent of the liquid component by weight (from about 0.5 to about 20 gallons per 1000 gallons of liquid).

Foamed fracture fluids are superior to conventional liquid fracturing fluids for problematic and water sensitive formations because foams contain less liquid than liquid fracturing fluids and have less tendency to leak. Also, foams have less liquid to retrieve after the fracturing operation is complete. Moreover, the sudden expansion of the gas in the foams when pressure in the well is relieved after the fracturing operation is complete promotes flow of residual fracture fluid liquid back into the well.

The gas volumetric fraction or "quality" of useful foamed fracture fluids is typically in the range of from about 60 volume percent to about 8C volume percent gas. However, stable foams with qualities of up to about 95% can be produced. In general, the viscosity of the foamed fluid increases with increasing quality. Proppant also increases the apparent viscosity of foamed fracture fluid.

Procedures for making and using foamed fracturing fluids are described in U.S. Pat. No. 3,937,283 to Blauer et al., and in U.S. Pat. No. 3,980,136 to Plummer et al. Briefly, these patents teach how to produce stable foam fracturing fluids using nitrogen, water, a surfactant and a sand proppant. The foam quality ranges between 53% to 99%. The foam is pumped down the well and into the formation at a pressure sufficient to fracture the formation. When the fracturing operation is complete, the pressure on the well is relieved at the wellhead. The foam is carried back into the well by the rush of expanding gas when pressure on the foam is reduced.

U.S Pat. Nos. 3,195,634 to Hill, 3,310,112 to Nielson et al., 3,664,422 to Bullen, and 4,627,495 to Harris et al., describe fracturing techniques using carbon dioxide as the gas phase. First, an emulsion of liquefied carbon dioxide and water is formed using a surfactant to promote dispersion. Proppant is added to the emulsion and the emulsion-proppant slurry is pumped down the wellbore into the formation at a pressure sufficient to fracture the subterranean formation. Downhole temperatures are above the critical temperature of carbon dioxide so the liquid carbon dioxide becomes a supercritical fluid as the emulsion approaches the subterranean formation forming a stable foam.

After the fracturing operation is complete the pressure on the well is reduced at the wellhead. The foam is broken and the rush of depressurized and expanding carbon dioxide back into the well entrains the residual fracturing fluid liquids and carries them out of the formation.

Carbon dioxide foams have deeper well capability than nitrogen foams. Carbon dioxide emulsions have greater density than nitrogen gas foams so that the surface pumping pressure required to reach a corresponding depth is lower with carbon dioxide than with nitrogen. Moreover, the higher density imparts greater proppant transport capability, up to about 12 lb of proppant per gal of fracture fluid. Carbon dioxide is acidic so that crosslinking agents compatible with carbon dioxide foams are generally limited to those active in the pH range of about 3 to about 5. Of the common crosslinkers this excludes borates from use with carbon dioxide because borates are not effective below a pH of about 8.

When first introduced commercially in the 1970's, the foamed fracture fluids were simply foams made from nitrogen or carbon dioxide and water. The proppant carrying capacity of these rudimentary foams was low, limited to about one or two lbs per gal, and fluid leakage into the formation was high, which limited fracturing applications to low pressure reservoirs typically sandstone, carbonate and shale reservoirs.

With time, incentives to extend foam procedures into deeper and higher pressure reservoirs increased. Higher pressure applications required more proppant carrying capacity, better leakage control, and foam stability at higher temperatures. These requirements were met by adding water soluble polymer gel viscosfiers to the aqueous phase. The hydratable polymers commonly used in liquid fracturing fluids are suitable also for foams, including guar and hydroxypropyl guar.

Foaming technology was steadily improved and new surfactants were employed that produced foams that were stable at higher temperatures encountered in deeper wells. By 1980, technology had developed that supported large scale hydraulic foam fracturing treatments which placed over one million lbs of sand proppant at carrying concentrations of up to 4 lb/gal of fracturing fluid in formations at temperatures as high as 270 F. Advances in carbon dioxide-water emulsion technology further extended treatment depth capability.

Shortly after delayed polymer gel crosslinkers were developed for conventional fracturing fluids in the early 1980's they were also added to the liquid phase of both nitrogen and carbon dioxide foamed fracturing fluids. Crosslinking the polymers increases the viscosity of the foams, typically, by a factor of two or more, which increases the proppant carrying capacity of the foams.

Another advantage of crosslinked foams is that they generally create wider fractures than uncrosslinked foams. The fractures generally are shorter for a given volume of fluid pumped. A shorter, wider fracture has less total fracture area exposed which limits fluid leakage into the formation and Improves placement of proppant in the fractures.

The same crosslinking agents that are used in conventional liquid fracturing fluids—Ti, Zr, Al, borates—are used in foamed fracturing fluids. Proppant concentrations up to as high as about 12 lb per gal have been reported using a crosslinked carbon dioxide foam.

As previously discussed, it is desired that most of the polymer filtercake deposited in the formation during fracturing be removed after the fracturing operation is complete to restore production capability. Foamed fracturing fluids leave thinner filtercakes than conventional liquid fracturing fluids thereby facilitating removal. Filtercakes from foams range between 0.04 to 0.15 mm in thickness compared with filtercake thicknesses of about 0.75 to 1.0 mm typically encountered with conventional liquid fracturing fluids.

Foamed fracturing fluids exhibit low liquid leakage into the formation because foams inherently have low liquid concentrations and the stable two-phase structure characteristic of foams minimizes leakage and promotes proppant transport and placement capability.

Today, even though foamed fracturing fluids cost 10% to 20% more than their fluid counterparts, they continue to be the stimulant of choice for fracturing problematic formations e.g., formations which are damaged by water leakage, or have low pressure or poor permeability.

Uncrosslinked foamed fluids are the cleanest fracturing fluids available; they leave the least residual filter cake and provide the maximum post fracture conductivity and formation permeability. However, experience has shown that filtercakes from crosslinked gels may be difficult to remove and may significantly interfere with production. The residual crosslinked filtercake impairs the permeability and conductivity of the formation, significantly reducing production rate and ultimate recovery of oil and gas from the subterranean bearing formation. This presents a problem since crosslinking is required in many foamed fracturing fluid applications to control fluid leakage in the formations and to increase the apparent viscosity of the foam so that the foam can fracture the formation effectively and exhibit the required proppant transport and placement capacity.

For the foregoing reasons there is a need for a roamed fracturing fluid that has the performance advantages of crosslinked gel foams but which deposits a filtercake which can be substantially completely removed after the fracturing operation is completed.

SUMMARY OF THE INVENTION

The present invention is directed to a foamed fracturing fluid composition and methods for fracturing subterranean hydrocarbon bearing formations using the foamed fracturing fluids that exhibit the desirable performance attributes of crosslinked foamed fracturing fluids but, unlike crosslinked foamed fracturing fluids, are more readily removed from the fractured formation after the fracturing operation is complete, leaving substantially no residual filtercake that restricts production of oil or gas.

The foamed fracturing fluid of the present invention utilizes an hydrophobically modified water soluble polymer to thicken and raise the viscosity of foamed fracturing fluid. These foamed fracturing fluids provide fracturing performance and proppant carrying capacity comparable to crosslinked foams but do not leave a significant amount of residual polymer filtercake in the formation.

The preferred hydrophobically modified water soluble associated polymer for the foamed fracturing fluids of the present invention is hydrophobically modified guar (HMG). The preferred range of concentration of HMG polymer in the liquid phase is typically in the range of from about 20 lbs of HMG per 1000 gal of aqueous base to about 60 lbs of HMG per 1000 gal of aqueous base. The most preferred range of HMG concentrations is from about 30 to about 45 lbs per 1000 gal of aqueous phase.

The preferred range of HMG foam quality is in the range from about 50% gas volume to about 90% gas volume. The most preferred range of HMG foam quality is from about 60% gas volume to about 75% gas volume.

The viscosifying effect of HMG polymers is amplified by the use an appropriate surfactant at a concentration in a specified range. The preferred surfactant for foamed fracturing fluids of the present invention is alpha olefin sulfonate. Other suitable surfactants include cationic, anionic, nonionic or amphoteric compounds, such as for example, betaines, sulfated or sulfonated alkoxylates, alkyl quaternary amines, alkoxylated linear alcohols, alkyl sulfonates, alkyl aryl sulfonates, $C_{10}$–$C_{20}$ alkyldiphenyl ether sulfonates and the like.

A suitable alternative associated hydrophobically modified polymer is hydrophobically modified hydroxyethylcellulose.

BRIEF DESCRIPTION OF THE DRAWINGS

These and other features, aspects and advantages of the present invention will be better understood from the following description, appended claims and accompanying drawings where:

FIG. 1 is a graph of isotherms of viscosity versus surfactant concentration.

FIG. 2 is a graph of viscosity versus temperature for three hydrophobically modified guar foam with different qualities.

DESCRIPTION OF THE INVENTION

Hydrophobically modified water soluble polymers increase viscosity of the aqueous phase via attractive interactions between hydrophobic groups on adjacent polymer molecules to form an associated network-like structure. The hydrophobic associations can be thought of as reversible pseudo-crosslinks without chemical bonding. The associations form a three-dimensional network which increases the viscosity of the solution.

For the hydrophobically modified polymer to be soluble in water, the number of hydrophobes per soluble molecule must be limited, and their chain length must be no more than about $C_8$–$C_{18}$. The hydrophobically modified water soluble polymer preferred for the fracturing fluid foams of the present invention is hydrophobically modified guar (HMG). Guar is a polygalagtomannan consisting of a mannan backbone with galactose branches. The composition and methods for synthesizing HMG are disclosed in U.S. Pat. No. 4,870,167 to Zody et al. which is incorporated herein by reference in its entirety.

The hydrophobic groups in HMG are grafted on to the guar polymer molecules in two steps. First an alkyl substituent selected from the group consisting of R—and HOR$^1$—wherein R is an alkyl group containing one to four carbon atoms, wherein R$^1$ is an alkylene group containing two to four carbon atoms and wherein the OH group is on the carbon atom beta to the ether group. Accordingly, the alkyl ethers of guar first formed are the methyl, ethyl, propyl, butyl hydroxyethyl, hydroxypropyl and hydroxy butyl ethers of guar.

The second alkyl substituent is selected from the group consisting of R$^2$, HOR$^3$, and

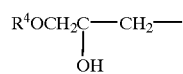

wherein R$^2$ is an alkyl group which contains about 8 to about 28 carbon atoms, wherein R$^3$ is an alkylene group which contains about 8 to about 28 carbon atoms having the OH group on the carbon atom beta to the ether group and wherein R$^4$ is an alkyl group containing about 5 to 25 carbon atoms. The first alkyl substituent, i.e., R—and HOR$^1$—, is present in a molecular substitution of about 0.3 to about 1.5. The second alkyl substituent, i.e., R$^2$, HOR$^3$ and

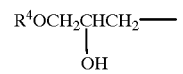

is present in a molecular substitution of about 0.001 to about 0.2 with the preferred molecular substitution being about 0.005 to about 0.10.

The guar alkyl ethers which are first formed can be prepared by dispersing guar as a powder in an organic solvent which is substantially inert and practically non-reacting under the reaction conditions with alkyl halides and alkylene oxides and further which is at least partially water miscible. The dispersed powder is then admixed with an aqueous alkali, such as an alkali metal hydroxide solution, and after a short time, a lower alkyl halide or alkylene oxide, e.g., methyl chloride, ethyl bromide, ethylene oxide, propylene oxide or butylene oxide is added to the mixture. The reaction can be conducted at elevated temperatures and/or under pressure. When the reaction is completed, the hydroxyalkylated guar is recovered by filtration.

Alkyl ethers of guar can also be prepared by reacting guar splits with an alkyl halide or an alkylene oxide. Guar gum splits are obtained after the removal of the hulls and the germs from guar seeds. The guar gums splits are mixed with sufficient water and alkali to swell the splits but insufficient to form a gel. The alkyl halide or the alkylene oxide is then added and the reaction is carried out under agitation, usually in an apparatus such as a ribbon blender. When the reaction is complete, the guar reaction product, still in particulate form, is washed to remove excess alkali, or salt formed in the reaction. The hydroxyalkylated guar gum is then dried to a moisture content of below about 10 percent and flaked.

The alkyl ethers of guar useful in this invention have a molecular substitution of from about 0.5 to about 1.5. The most preferred alkyl ethers for the purpose of this invention are methyl guar, hydroxyethyl guar and hydroxypropyl guar having a molecular substitution of from about 0.6 to about 1.2.

The second step is to react the alkyl ether of guar with a long aliphatic chain epoxy compound which contains from about 8 to about 28 carbon atoms or an alkyl halide having about 8 to about 28 carbon atoms in the alkyl group. Examples of such epoxy compounds are 1,2 epoxyoctane, 1,2-epoxydodecane, 1,2-epoxyhexadecane, 1,2-epoxytdetracosane and the like. Other suitable long chain epoxy compounds are glycyl ethers of amyl alcohol, hexano octanol, lauryl alcohol, stearyl alcohol, lignoceryl alcohol, and the like. Examples of useful alkyl halides are octyl chloride, decyl bromide, dodecyl iodine, hexadecyl bromide and the like.

The reaction of the long chain compounds with the alkyl ether of the guar is conducted in a solvent under alkaline catalysis. The solvent must be one which swells and, preferably, does not dissolve the hydroxyalkyl ether, and must be miscible with the long chain compound. By using such a solvent, the long chain compound can intimately contact the guar so that the alkylation reaction can take place. The solvent must be also capable of absorbing from about 10 to about 50 weight percent water. Examples of suitable solvents are methanol, ethanol, Isopropanol, dimethyl formamide and bis(2-methoxyethyl)ether. The preferred solvents are methanol and isopropanol.

The alkaline catalysts used in the second step are sodium hydroxide and potassium hydroxide. Such catalysts are generally used as an alcoholic solution although they can be used in the solid state.

Under the conditions in which the long chain alkylation reaction is conducted, underivatized guar does not react with the long chain alkyl halide or epoxy compound. In order for the reaction to take place, the guar must first be alkylated with a short chain alkyl halide or alkylene oxide.

For purposes of this invention the molecular substitution of the long chain derivative is about 0.001 to about 0.2 and, preferably, about 0.005 to about 0.1.

The solution viscosity of soluble hydrophobically modified polymers peaks sharply over a relatively narrow range of concentrations of polymer concentrations. The peak viscosity and the concentration range over which it occurs depend on the amount and chain length of the hydrophobe. At a given concentration, the longer the chain length the higher the viscosity. Also, peak viscosity at a given polymer concentration increases with alkyl chain length. For the HMG of this invention, the preferred HMG concentrations for maximum viscosity enhancement is in the range of about 20 to 60 lbs of polymer per 1000 gals of aqueous phase. The most preferred polymer concentration is in a range of from about 30 to about 45 lbs per 1000 gals of aqueous phase.

Surfactants have a profound effect on solution viscosity. The preferred surfactant for the foamed fracturing fluid of the present invention is alpha olefin sulfonate, which is sold commercially. Other suitable surfactants include cationic, anionic, nonionic or amphoteric compounds, such as for example, betaines, sulfated or sulfonated alkoxylates, alkyl quaternary amines, alkoxylated linear alcohols, alkyl sulfonated, alkyl aryl sulfonates, $C_{10}$–$C_{20}$ alkyldiphenyl ether sulfonates and the like. The particular surfactant employed will depend upon the type of formation which is to be fractured. The concentration of the surfactant in the liquid phase of the formulation is typically in the range of from about 0.3 gal of surfactant per 1000 gals of aqueous phase to about 10 gal of surfactant per 1000 gals of aqueous phase. The preferred surfactant concentration range is from about 2 gal of surfactant per 1000 gals of aqueous phase to about 7.5 gal of surfactant per 1000 gals of aqueous phase. Surfactant forms micelles in the aqueous phase which increase associative interactions amongst hydrophobe groups on the HMG molecules, further increasing viscosity. However, there is an optimum range of surfactant concentrations over which the viscosity enhancement is maximum. If the amount of surfactant added exceeds the optimum range, then the hydrophobic groups on the polymer molecules associate only with surfactant micelles and do not associate with other hydrophobic groups. These surfactant effects can be discerned in the following example:

EXAMPLE 1

HMG obtained from Rhone-Poulenc "POLYMER RT-200, SCN 13380" guar was batch mixed with water to a concentration of 40 lb of polymer per 1000 gal of water. In this sequence of experiments the concentration of alpha olefin sulfonate surfactant (Halliburton "AQF-2" surfactant) added to the polymer solution was varied between 2.5 gal per 1000 gal of aqueous solution to 10 gal per 1000 gal of aqueous solution. The base gel was formed by mixing HMG, water and the surfactant in a "WARING" blender. Buffers were added to adjust pH. The gel was pumped into a recirculating flow loop viscosimeter and pressurized to 1000 psi at about 75° F. The experimental procedure is described in detail in the following technical papers: Harris, P. C. and Reidenbach, V. G,: "High-Temperature Rheological Study of Foam Fracturing Fluids", *J. Petr. Tech*, (May 1987) 613–619 and SPE 20642, "A Comparison of Mixed Gas Foams With N2 and CO2 Foam Fracturing Fluids on a Flow Loop Viscosimeter", by Harris, P. C.

Nitrogen gas was bled into the loop while recirculating at a shear rate of 1000/sec. A 70% quality foam was generated by displacing 452 ml of liquid from the 645 ml volume loop. The foam was circulated for five minutes at a shear rate of 1000/sec to reach equilibrium texture.

After initial equilibration, the shear rate was lowered to 170/sec and the temperature was linearly ramped up from room temperature to a maximum of 300° F. The viscosity vs. temperature function for foams at several surfactant concentrations were determined over a temperature range of 100° F. to 300° F. These data are displayed in FIG. 1 as isotherms of viscosity vs surfactant concentration. The data show that the viscosity of the foam is sensitive to the concentration of surfactant and to temperature. The maximum viscosity enhancement was obtained with 5 gal per 1000 gal surfactant in the aqueous phase. Significant viscosity enhancement was observed at surfactant concentrations between about 2.5 and about 10 gal per 1000 gal of aqueous phase at temperatures below about 250° F. The viscosity enhancement peak appears to shift to slightly higher surfactant concentration as temperature increases. Above about 250° F. the foam exhibited no viscosity enhancement regardless of surfactant concentration.

The effect of foam quality on viscosity enhancement with HMG was examined in Example 2.

EXAMPLE 2

Nitrogen HMG foams of 25%, 50% and 70% quality were produced using the procedure of Example 1. It was hypothesized that less surfactant is required as quality is increased because there is less internal liquid-gas surface area interface. This would induce formation of excess surfactant micelles and reduce associative viscosity enhancement. This hypothesis was confirmed as can be seen in FIG. 2 which displays plots of viscosity vs. temperature for the foams. The surfactant concentration was 40 gal per 1000 gal of aqueous phase for all three foams. Viscosity enhancement decreases with decreasing foam quality.

The advantage of HMG foamed fracturing fluid over crosslinked foamed fracturing fluids is that HMG foam matches the fracturing performance of crosslinked foams but in contrast to crosslinked foams HMG foams readily wash away after the fracturing is complete. This capability was confirmed by observations in which HMG foams and crosslinked foams were prepared in a "WARING" blender. HMG foams drained out of the blender in less than an hour. In contrast crosslinked foams did not drain well over a period of several days.

HMG foams were compared with foams made using an alternative commercially available hydrophobically modified polymer, hydrophobically modified hydroxyethylcellulose which was obtained from Aqualon as "NATROSOL PLUS 430" polymer. The synthesis and characteristics of hydrophobically modified hydroxymethylcellulose is discussed in the reference "Water-Soluble Polymers; Synthesis, Solution Properties and Applications", Shalaby, S. W., McCormick, C. L. and Butler, G. W., A.C.S. Symposium Series, No. 467, 1991 which is incorporated by reference herein. The viscosity enhancement of the hydroxyethylcellulose foams was not reproducible, ranging from nil to approaching but not matching the viscosity enhancement from HMG. Moreover, hydroxyethylcellulose foams enhanced viscosity over a narrower temperature range than HMG foams: 75° F. to 170° F. enhancement range for hydroxyethylcellulose foams compared with 75° F. to about 225° F. enhancement range for HMG foams. From these experiments it was concluded that HMG polymer foamed fracturing fluid were superior although hydroxymethylcellulose foams were acceptable.

The preceding examples were provided to elucidate the present invention and not to limit the scope of the invention.

Following is a typical procedure for fracturing a subterranean formation using the foamed fracturing fluids of the present invention. The description is representative of many possible applications of the invention and should not be interpreted as limiting the scope of the appended claims.

Water from a suitable source available at the site is pumped into a tank. HMG polymer is added to the water in the tank and batch mixed into the water. The water tank is typically a large tank holding up to about 20,000 gals of water. The HMG and water are mixed using any suitable mixing device such as a motor driven propeller or turbine agitator. Alternatively, the HMG and water are mixed by recirculating the water from the bottom of the tank to the top using a suitable pump, such as a centrifugal pump. The water and HMG are mixed in the water tank for a time sufficient to uniformly distribute the HMG and to form and stabilize the HMG polymer-water soluble gel.

To initiate the fracturing operation, the HMG polymer gel solution is pumped using a transfer pump out of the water tank at a controlled rate, into and through a blender zone. The transfer pump can be the same pump used to circulate the contents of the water tank to mix the HMG into the water. The blender zone typically contains agitators or mixers for mixing the various components of a fracturing fluid.

Sand or other proppant is fed at a controlled rate into the blender zone using an auger screw conveyor or other suitable solid feed metering device into the blender zone and admixed into the HMG solution to form a slurry. The surfactant and any other conditioning and treating chemicals added to improve the fracturing fluid such as pH controlling buffers and clay control agents are fed into the mixing zone at a controlled rate and admixed into the HMG solution in the blending zone. The HMG solution proppant slurry is pumped from the blending zone using a suitable pump such as a centrifugal pump to the suction of a high pressure pump.

High pressure nitrogen from a nitrogen source or liquid carbon dioxide from a carbon dioxide source on a combination of $N_2$ and $CO_2$ is injected into the gel solution proppant slurry at a controlled rate in a foam generator located in the line past the high pressure pump. The nitrogen source can be a tank truck containing liquid nitrogen. The liquid nitrogen is vaporized in a heater upstream of the foam generator. The foam generator may comprise a device as simple as a "IT" connection where the nitrogen gas is injected into the line through which the HMG gel solution flows between the high pressure pump and the wellhead, or any other suitable apparatus which provides good contacting between the nitrogen gas and the gel solution. The nitrogen gas turbulently admixes with the polymer gel solution containing the surfactant to form the foamed fracturing fluid. Vigorous contacting of the nitrogen and the gel-surfactant solution immediately converts the gel solution to a stable foam. Foam quality is determined by the ratio of nitrogen to polymer gel solution that are mixed together.

The fluid carrying the proppant is fed into the suction of a high pressure pump which boosts the pressure of the fracturing fluid to formation pressure and pumps the mixture into the wellhead and down into to the subterranean formation being treated. Gas is added past the high pressure pump. The foamed fracturing fluid is pumped into the formation at a rate and pressure sufficient to fracture the formation. After the specified amount of fracturing fluid and proppant are fed into the formation, the wellbore is shut-in by closing a valve at the surface for a period of time sufficient to permit stabilization of the subterranean formation. Typically, the well is shut-in long enough for the formation to at least partially close upon the proppant material and stabilize the fracture volume. The shut-in period can last from several minutes to in excess of about 12 hours but typically is in the range of about 1 to 2 hours. After the subterranean formation has stabilized and the shut-in period is complete, the shut-in valve is opened. The pressure drop that occurs in the well causes the foam to break. The nitrogen gas from the foam moves rapidly from the formation into the wellbore and exits the wellbore at the surface. The escaping gas carries most of the liquid residue from the fracturing fluid with it out of the formation, which leaves the formation and the wellbore clean and ready for the commencement of production.

When using carbon dioxide, a liquid-liquid emulsion of carbon dioxide liquid and aqueous polymer gel solution is produced by admixing liquid carbon dioxide with the polymer gel proppant slurry. The liquid carbon dioxide is drawn from a surface vessel or tank truck. The carbon dioxide is below its critical temperature and pressure so that the carbon dioxide is in the liquid state. Typical conditions are, for example, 0° F. and 300 psia. The volumetric ratio of polymer gel solution to liquid carbon dioxide in the emulsion is controlled because this ratio determines the quality of the foam to be formed. Typically, the carbon dioxide to aqueous solution ratio is the range of from about 1:1 to about 20:1. Preferably, the initial ratio is in the range of from about 2:1 to about 18:1. Foams formed from emulsions in this range will have a quality of from in excess of about 50 percent to in excess of about 96 percent. The turbulent contact between the liquid carbon dioxide and the polymer gel solution proppant slurry in the "T" or other mixing device forms the liquid-liquid emulsion of carbon dioxide and HMG gel solution. The emulsion is stabilized by the surfactant and it supports the dispersion of proppant.

The emulsion/proppant slurry is pumped into the wellbore using the high pressure pump. The fracture fluid emulsion is still in the liquid phase as it enters the wellhead. As the fracturing fluid flows down towards the subterranean formation, it heats up to a temperature that is above the critical temperature of carbon dioxide converting the carbon dioxide fluid liquid-liquid emulsion to a foamed fracturing fluid. The conversion to foam may occur either during passage through the wellbore or during penetration into the formation being fractured. Remarkably, the viscosity of the fluid does not change significantly as it changes from a liquid-liquid emulsion to a liquid supercritical fluid foam and the proppant transport capability is maintained throughout. The surfactant and HMG polymer stabilize the foam.

The fracturing fluid is pumped into the subterranean formation at a rate and pressure sufficient to fracture the formation. After the specified amount of fracturing fluid and proppant are deposited in the formation, the well is shut-in as is done in the nitrogen foam procedure described previously. The fracturing operation is concluded by opening the shut-in valve to relieve the pressure on the well. When the pressure on the formation is relieved, the carbon dioxide expands and rushes back out of the formation and into the wellbore entraining most of the fracturing fluid liquids. The carbon dioxide and entrained liquid are expelled from the bore at the wellhead on the surface leaving the formation and wellbore clean and ready to commence production.

Admixtures of nitrogen gas and liquid carbon dioxide function in a similar manner as described above for the individual components.

What is claimed is:

1. A foamed fracturing fluid comprising an aqueous phase a, gaseous phase and a proppant wherein the aqueous phase comprises:
   (a) an associated polymer comprising hydrophobically modified guar wherein the hydrophobic groups on the hydrophobically modified guar consist of at least two different alkyl substituents wherein the first alkyl substituent is selected from the group consisting of R and $HOR^1$, wherein R is an alkyl group containing one to four carbon atoms, wherein $R^1$ is an alkylene group containing two to four carbon atoms and wherein the OH group is on the carbon atom beta to the ether group, wherein the second alkyl substituent is selected from the group consisting of $R^2$, $HOR^3$ and

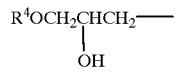

wherein $R^2$ is an alkyl group containing about eight to about twenty eight carbon atoms, wherein $R^3$ is an alkylene group which contains about 8 to about 28 carbon atoms having the OH group on the carbon atom beta to the ether group and wherein $R^4$ is an alkyl group containing about 5 to about 25 carbon atoms, wherein the substituent, R or $HOR^1$, is present in a molecular substitution of about 0.3 to about 1.5 and wherein the substituent $R^2$, $HOR^3$, or

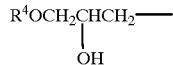

is present in a molecular substitution of about 0.001 to about 0.2; and
   (b) a surfactant.

2. The foamed fracturing fluid of claim 1 wherein the surfactant is alpha olefin sulfonate.

3. The foamed fracturing fluid of claim 2 wherein the concentration of hydrophobically modified guar in the aqueous phase is in the range from about 20 to about 60 lbs per 1000 gal of aqueous phase.

4. The foamed fracturing fluid of claim 2 wherein the concentration of hydrophobically modified guar in the aqueous phase is in the range from about 30 to about 45 lbs per 1000 gal of aqueous phase.

5. The foamed fracturing fluid of claim 2 wherein the concentration of alpha olefin sulfonate in the aqueous phase is in the range of from about 0.3 to about 10 gal per 1000 gal of aqueous phase.

6. The foamed fracturing fluid of claim 1 wherein the quality of the foamed fracturing fluid is in the range of from about 50% gas volume to about 90% gas volume.

7. The foamed fracturing fluid of claim 2 wherein the quality of the foamed fracturing fluid is in the range of from about 60% gas volume to about 75% gas volume.

8. The foamed fracturing fluid of claim 2 wherein the gaseous phase includes nitrogen.

9. The foamed fracturing fluid of claim 2 wherein the gaseous phase includes carbon dioxide at a temperature and pressure above supercritical conditions.

* * * * *